(12) United States Patent
Gauthier et al.

(10) Patent No.: US 10,826,973 B2
(45) Date of Patent: Nov. 3, 2020

(54) SECURITY SYSTEM INCLUDING BUSINESS CONTINUITY PROVIDER

(71) Applicant: CARRIER CORPORATION, Farmington, CT (US)

(72) Inventors: Ed Gauthier, Fairport, NY (US); Ben Holm, Farmington, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 163 days.

(21) Appl. No.: 16/075,170

(22) PCT Filed: Jan. 24, 2017

(86) PCT No.: PCT/US2017/014682
§ 371 (c)(1),
(2) Date: Aug. 3, 2018

(87) PCT Pub. No.: WO2017/136183
PCT Pub. Date: Aug. 10, 2017

(65) Prior Publication Data
US 2019/0037007 A1    Jan. 31, 2019

Related U.S. Application Data

(60) Provisional application No. 62/291,055, filed on Feb. 4, 2016.

(51) Int. Cl.
*H04L 29/08* (2006.01)
*H04L 29/14* (2006.01)

(52) U.S. Cl.
CPC .............. *H04L 67/10* (2013.01); *H04L 67/02* (2013.01); *H04L 67/12* (2013.01); *H04L 67/14* (2013.01); *H04L 67/2823* (2013.01); *H04L 69/40* (2013.01)

(58) Field of Classification Search
CPC ..... H04L 69/40; H04L 67/10; H04L 67/2823; H04L 67/02; H04L 67/14; H04L 67/12
See application file for complete search history.

(56) References Cited

U.S. PATENT DOCUMENTS 8,135,838 B2    3/2012  Geist
8,365,271 B2    1/2013  Blum
(Continued)

FOREIGN PATENT DOCUMENTS

GB      2521382 A       6/2015
WO      2015017918 A1   2/2015
WO      2015057237 A1   4/2015

OTHER PUBLICATIONS

International Search Report and Written Opinion for International Application No. PCT/US2017/014682; Application Filing Date Jan. 24, 2017; dated Mar. 30, 2017; 13 Pages.

*Primary Examiner* — Moustafa M Meky
*Assistant Examiner* — Kidest Mendaye
(74) *Attorney, Agent, or Firm* — Cantor Colburn LLP

(57) ABSTRACT

A security system network comprises a cloud computing security system operable in a cloud computing network and a local security hardware system in signal communication with the cloud computing security system. The security system network further comprises a BCP module that includes a first input/output (I/O) terminal in first signal communication with the cloud computing network and a second I/O terminal in second signal communication with the local security hardware. The BCP module selectively establishes a third signal communication between at least one local client application and the local security hardware system so as to exchange data between the local security hardware system and the at least one local client application independently from an operational status of the first signal communication.

11 Claims, 3 Drawing Sheets

(56) References Cited

U.S. PATENT DOCUMENTS

| | | |
|---|---|---|
| 8,527,549 B2 | 9/2013 | Cidon |
| 8,782,637 B2 | 7/2014 | Khalid |
| 9,137,304 B2 | 9/2015 | Novotny |
| 2010/0238019 A1 | 9/2010 | Richman |
| 2011/0083138 A1* | 4/2011 | Sivasubramanian ........................ G06F 16/217 719/328 |
| 2012/0179802 A1 | 7/2012 | Narasimhan |
| 2013/0117337 A1* | 5/2013 | Dunham ................ G06F 16/182 707/827 |
| 2013/0204849 A1 | 8/2013 | Chacko |
| 2013/0307971 A1* | 11/2013 | Ganesan .......... H04N 21/21805 348/143 |
| 2014/0085480 A1* | 3/2014 | Saptharishi ............. G06F 16/71 348/159 |
| 2014/0280948 A1 | 9/2014 | Schmidt |
| 2014/0282536 A1 | 9/2014 | Dave |
| 2015/0022666 A1* | 1/2015 | Kay ..................... H04L 67/025 348/159 |
| 2015/0032817 A1 | 1/2015 | Garg |
| 2015/0074749 A1* | 3/2015 | Vasko ................ G05B 19/4185 726/1 |
| 2015/0135302 A1 | 5/2015 | Cohen |
| 2015/0161551 A1* | 6/2015 | Warren ............ G06Q 10/06395 705/7.41 |
| 2015/0281453 A1* | 10/2015 | Maturana ............ H04M 3/5233 379/265.12 |
| 2015/0341445 A1* | 11/2015 | Nikolov ................ G06F 9/5072 709/203 |
| 2016/0088326 A1* | 3/2016 | Solomon .............. H04N 21/254 725/12 |

\* cited by examiner

SECURITY SYSTEM INCLUDING BUSINESS CONTINUITY PROVIDER

CROSS-REFERENCE TO RELATED APPLICATIONS

This application is a National Stage of International Application Serial No. PCT/US2017/014682, filed Jan. 24, 2017, which claims priority to U.S. Provisional Application Ser. No. 62/291,055, filed Feb. 4, 2016, the contents of which are hereby incorporated by reference in its entirety.

TECHNICAL FIELD

The present disclosure relates generally to a security system, and more specifically, to security systems utilizing a cloud-based data network.

BACKGROUND

As product services move to leverage cloud-based network capabilities, more functionality is dependent on internet connectivity between a customer's premise, e.g., local network, and the cloud-based network. In many cases, given the current reliability of internet providers, implementing various service functions in the cloud-based network is an acceptable risk given the substantial recovery of local resources and reduced local hardware costs.

With respect to security system product services, however, the dependency on a cloud-based network to access various service functions may pose different issues that are not appreciated in traditional service systems. For instance, some customers of security systems designed to control access to a facility may require additional measures to ensure continuity of service. Specifically, while on premise, customers may need continuous ability to monitor events local and control hardware installed on the local premises.

SUMMARY

According to embodiment, a method of controlling a security system network comprises establishing a first signal communication between a local security hardware system and a cloud computing security system via an electronic business continuity provider (BCP) module. The cloud computing security system is operable in a cloud computing network. The method further establishes a second signal communication between at least one local client application and the cloud computing security system. The method further selectively establishes a third signal communication between the at least one local client application and the local security hardware system via the BCP module so as to exchange data between the local security hardware system and the at least one local client application independently from an operational status of the first signal communication.

In addition to one or more of the features described above or below, or as an alternative, further embodiments include at least one of operation of the cloud computing security system, operation of the cloud computing network, and a data connection between the BCP module and the cloud computing network. The BCP module establishes the third signal communication in response to a faulty operation of at least one of the cloud-based security system and the cloud computing network. The at least one local application delivers at least one security command via the BCP to command the local security hardware to perform at least one security operation independently from the operational status of the first signal communication. The at least one security operation includes locking or unlocking a physical entryway. The BCP receives at least one hardware status signal from the security hardware, and physically alerts an electronic device supporting the at least one local application in response to receiving the at least one hardware status signal. The physical alert includes at least one of a physical vibration, graphical alert, and sound alert. The BCP buffers at least one event received from the local security hardware during the disconnection of the first signal communication; and subsequently delivers the at least one buffer event to the cloud security system in response to re-establishing the first signal communication.

According to further embodiment, a security system network comprises a cloud computing security system operable in a cloud computing network and a local security hardware system in signal communication with the cloud computing security system. The security system network further comprises a BCP module that includes a first input/output (I/O) terminal in first signal communication with the cloud computing network and a second I/O terminal in second signal communication with the local security hardware. The BCP module selectively establishes a third signal communication between at least one local client application and the local security hardware system so as to exchange data between the local security hardware system and the at least one local client application independently from an operational status of the first signal communication.

In addition to one or more of the features described above or below, or as an alternative, further embodiments include at least one of operation of the cloud computing security system, operation of the cloud computing network, and a data connection between the BCP module and the cloud computing network. The BCP module stores at least one communication address corresponding to an electronic device operating the at least one local client, detects disconnection of the first signal communication, automatically establishes the third signal communication with electronic device corresponding to the at least one stored communication address in response to the disconnection, and outputs an alert signal that physically alerts the electronic device of the detected disconnection. The at least one local application delivers at least one security command via the BCP to command the local security hardware to perform at least one security operation independently from the operational status of the first signal communication. The at least one security operation includes locking or unlocking a physical entryway. The BCP receives at least one hardware status signal from the security hardware, and physically alerts an electronic device supporting the at least one local application in response to receiving the at least one hardware status signal, the physical alert including at least one of a physical vibration, graphical alert, and sound alert. The BCP buffers at least one event received from the local security hardware during the disconnection of the first signal communication; and subsequently delivers the at least one buffer event to the cloud security system in response to re-establishing the first signal communication.

BRIEF DESCRIPTION OF THE DRAWINGS

The subject matter which is regarded as the present disclosure is particularly pointed out and distinctly claimed in the claims at the conclusion of the specification. The foregoing and other features of the present disclosure are apparent from the following detailed description taken in conjunction with the accompanying drawings in which:

DETAILED DESCRIPTION

Figure 1:
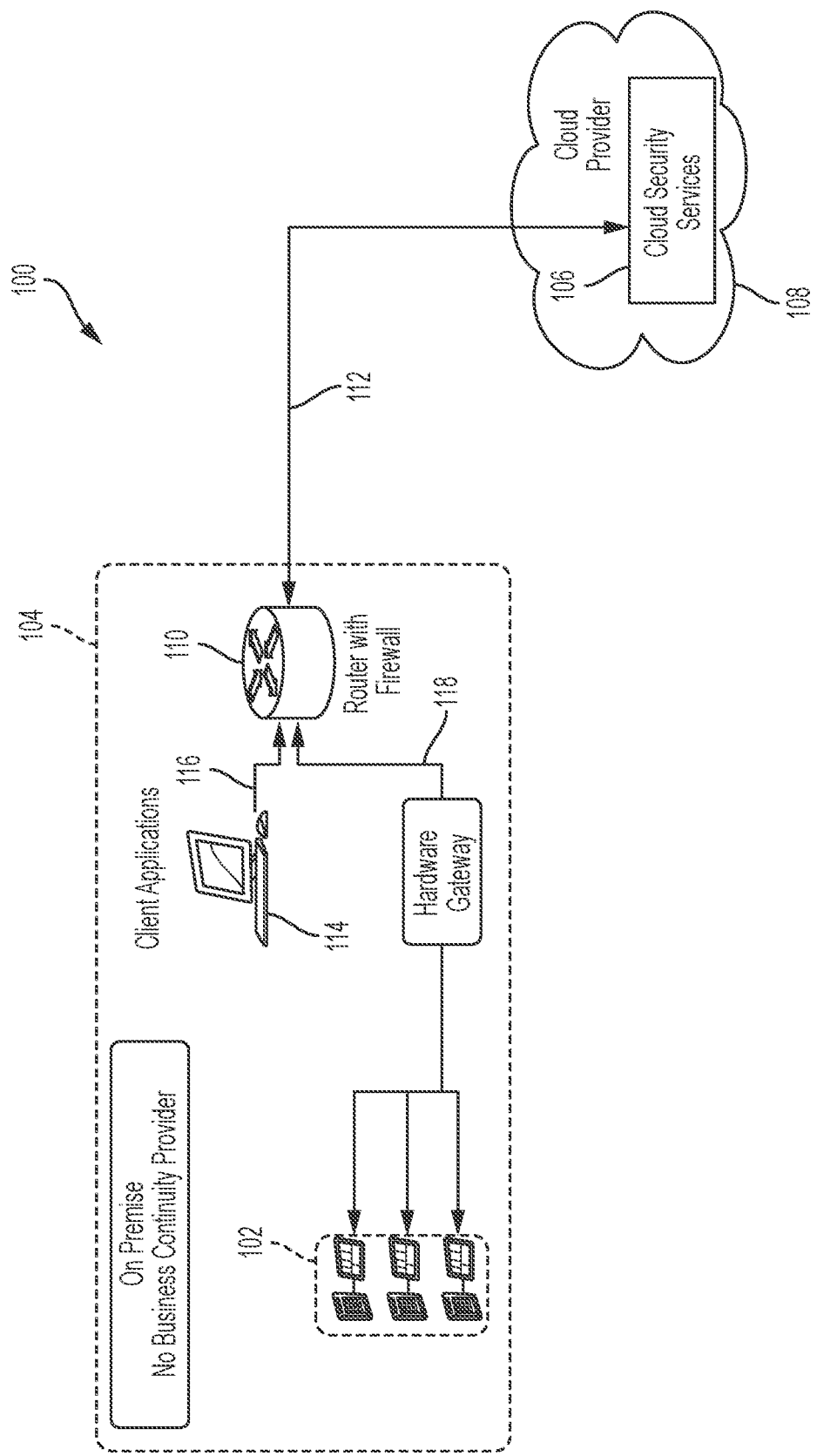
FIG. 1 is a diagram of a conventional security system that utilizes a cloud computing network to support various services and security system functions.

With reference now to FIG. 1, a conventional security system 100 is illustrated. The security system 100 includes security hardware 102 installed at local premises or business facility 104, and a cloud-based security system 106 supported by a cloud computing network 108. A network communication device 110 such as a router 110, for example, establishes one or more signal communication sessions 112 (i.e., a signal communication) between the cloud computing network 108 and one or more devices (e.g., security hardware, mobile devices, computing devices, mobile tablets, security cameras, etc.) located at the local premises 104.

As further illustrated in FIG. 1, the local security hardware 102 and one or more local electronic devices 114 operating one or more client applications (i.e., apps) establish respective signal communication sessions 116-118 with the cloud computing network 108 so as to exchange data with the cloud-based security system 106. In a conventional security system 100, however, the signal communication session 116 between the local devices 114 and the cloud computing network 108 is separate and independent from the signal communication session 118 between the security hardware 102 and the cloud computing network 108. Consequently, when the cloud computing network 108 malfunctions (e.g., signal communication is lost between the local premises 104 and the cloud computing network 108), local client applications running on the local devices 114 lose capability of exchanging data with the security hardware 102. As a result, the customer at the local premises 104 is no long capable of controlling and/or monitoring the security hardware 102.

Figure 2:
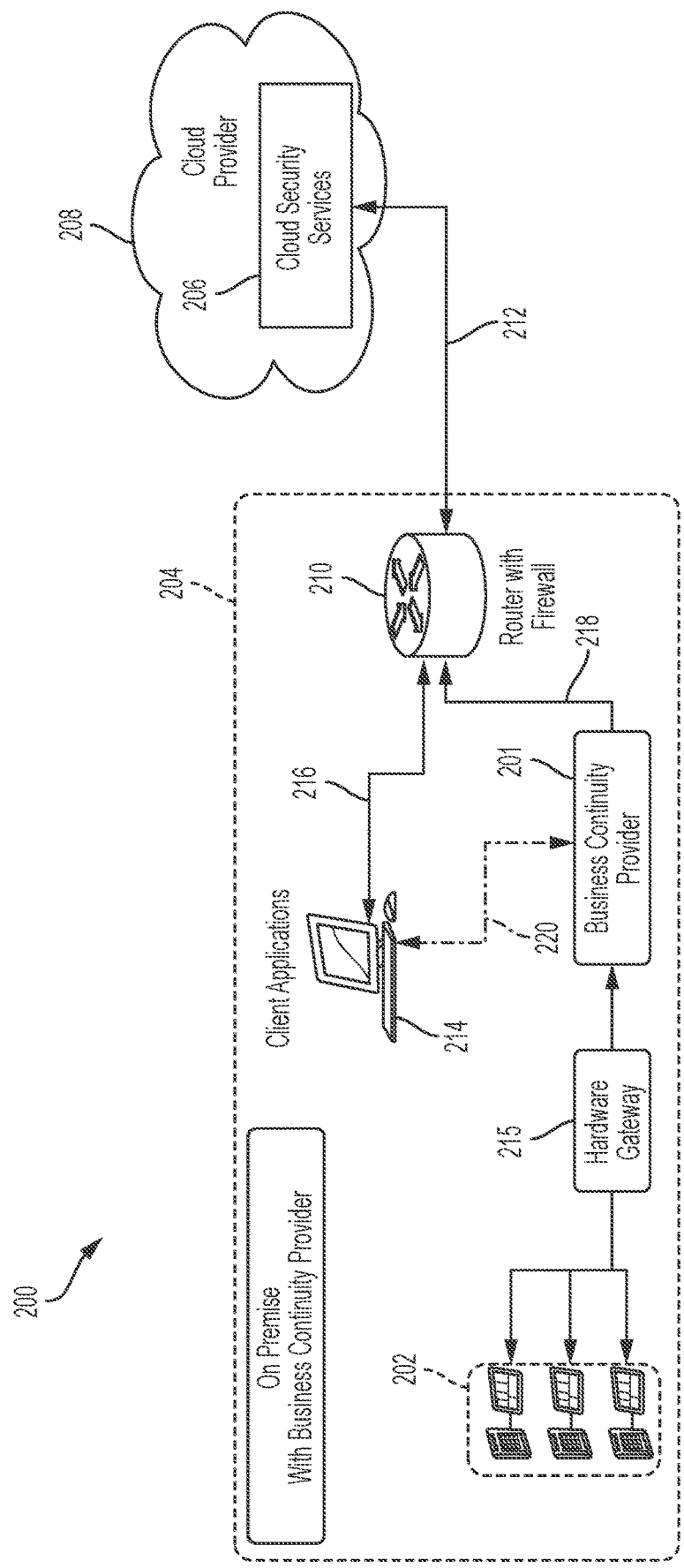
FIG. 2 is a diagram of a security system that utilizes a cloud computing network according to at least one non-limiting embodiment.

Turning now to FIG. 2, a security system 200 including an electronic business continuity provider (BCP) control module 201 is illustrated according to at least one non-limiting embodiment of the invention. The security system 200 includes security hardware 202 installed at local premises or business facility 204, and a cloud-based security system 206 supported by a cloud computing network 208. The hardware security 202 includes, for example, card readers, video cameras, motion detectors, entryway locking mechanisms, hardware access panels, voice recognition devices, and various other biometric identification systems. A network communication device 210 such as a router 210, for example, establishes one or more signal communication sessions 212 (i.e., a signal communication) between the cloud computing network 208 and one or more devices (e.g., security hardware, mobile devices, computing devices, mobile tablets, security cameras, etc.) located at the local premises 204.

One or more electronic devices 214 may be located at the local premises 204 and are capable of electrically communicating with the cloud computing network 208 via the network communication device 210. The electronic devices 214 may operate one or more client apps capable of exchanging data with the cloud-based security system 206. The client apps include, for example, web-based applications manipulated via an internet webpage accessed by the electronic device 214. In this manner, the client apps may provide the customer with various security monitoring and control functions offered by the cloud-based security system 206. Security monitoring functions include, for example, monitoring and logging locations where entry access is granted and/or denied, motion detection, unauthorized access breach. The control functions include, for example, locking/unlocking of a particular entryway, global lockdown/unlock commands, etc.

As further illustrated in FIG. 2, the local security hardware 202 and the local electronic devices 214 establish respective signal communication sessions 216-218 with the cloud computing network 208 via the network communication device 210 so as to exchange data with the cloud-based security system 206. The cloud-based security system 206 is configured to provide various security monitoring and security hardware control functions including, but not limited to, local premises monitoring via video cameras, entryway status monitoring (e.g., door/window ajar, etc.), entryway access control (e.g., locking doors/windows), voice intercommunication device control, and lightning control. In addition, the cloud-based security system 206 includes various backend services including, but not limited to, a communication server relay layer, open access services such as web-based application programming interfaces (APIs), etc.

A hardware gateway 215 is installed at the local premises 204 and operates as a device translation layer between the security hardware 202 and the cloud-based security system 206. In at least one embodiment, the hardware gateway 215 includes one or more device drivers that establish data exchange between the cloud-based security system 206 and different types of hardware security 202. The hardware gateway 215 is also configured to actively initiate signal communication with the cloud-based network 206 to establish a communication session 218 without requiring the customer to open one or more communication ports. In this manner, the security system 200 provides the customer with a more secure network.

Unlike conventional security systems (see FIG. 1), at least one embodiment of the disclosure includes an intermediate electronic control module, i.e., a BCP control module 201, installed at the local premises 204. The BCP control module 201 is electrically connected between the security hardware 202 via the hardware gateway 215 and the cloud computing network 208 via the network communication device 210. In addition, the BCP control module 201 is capable of providing a continued local signal communication session with the local electronic devices 214 independent of the operating status of the cloud computing network 208 and/or the cloud-computing security system 206.

According to a non-limiting embodiment, the local devices 214 selectively establish a local signal communication session 220 with the BCP control module 201 when the cloud-based security system 206 and/or the cloud computing network 208 becomes inoperable. In at least one embodiment, the local devices 214 initially communicate with the BCP control module 201, while the BCP control 201 monitors (e.g., pings) the operations status of the cloud-based security system 206 and/or the cloud computing network 208. When the of the cloud-based security system 206 and/or the cloud computing network 208 are operating properly, the BCP control module 201 instructs the local device 214 to control and monitor the system 200 using the cloud-based security system 208 (e.g., via communication sessions 212, 216 and 218) and ends the local communication session 220 with the local device 214.

When, however, the BCP module 201 detects faulty operation of the cloud-based security system 206 and/or the cloud computing network 208, the BCP module 201 maintains the local communication session 220, and establishes control and/or monitoring functionality between the local devices 214 and the hardware security 202. In this manner, at least one local client application operating on a respective local device 214 may exchange data with the local security hardware system 202 via the BCP module 201 so as to maintain various security monitoring and control functions independently from the operational status of the cloud-based security system 206 and/or the cloud-computing network 208. In addition, the BCP module 201 may log events and control requests while the hardware security 202 is monitored and controlled by the local apps via the local communication session 220. Once operation of the cloud-based security system 206 and/or the cloud-computing network 208 is restored, the logged events and control requests may be uploaded to the cloud-based security system 206 so as to refresh and update the system 200.

In at least one embodiment, the BCP module 201 may detect that the cloud computing network 208 is operating properly, but that the cloud-based security system 206 is operating improperly. In this case, the BCP module 201 may determine registration of one or more local devices 204, establish the local communication session 220, and then actively alert the local devices 204 of the cloud-based security system fault. The alert includes, but is not limited to, a physical vibration, a graphical alert, and/or a sound alert. In this manner, the customer may be notified of the cloud-based security system fault while still having access to various security monitoring and/or control functions.

Figure 3:
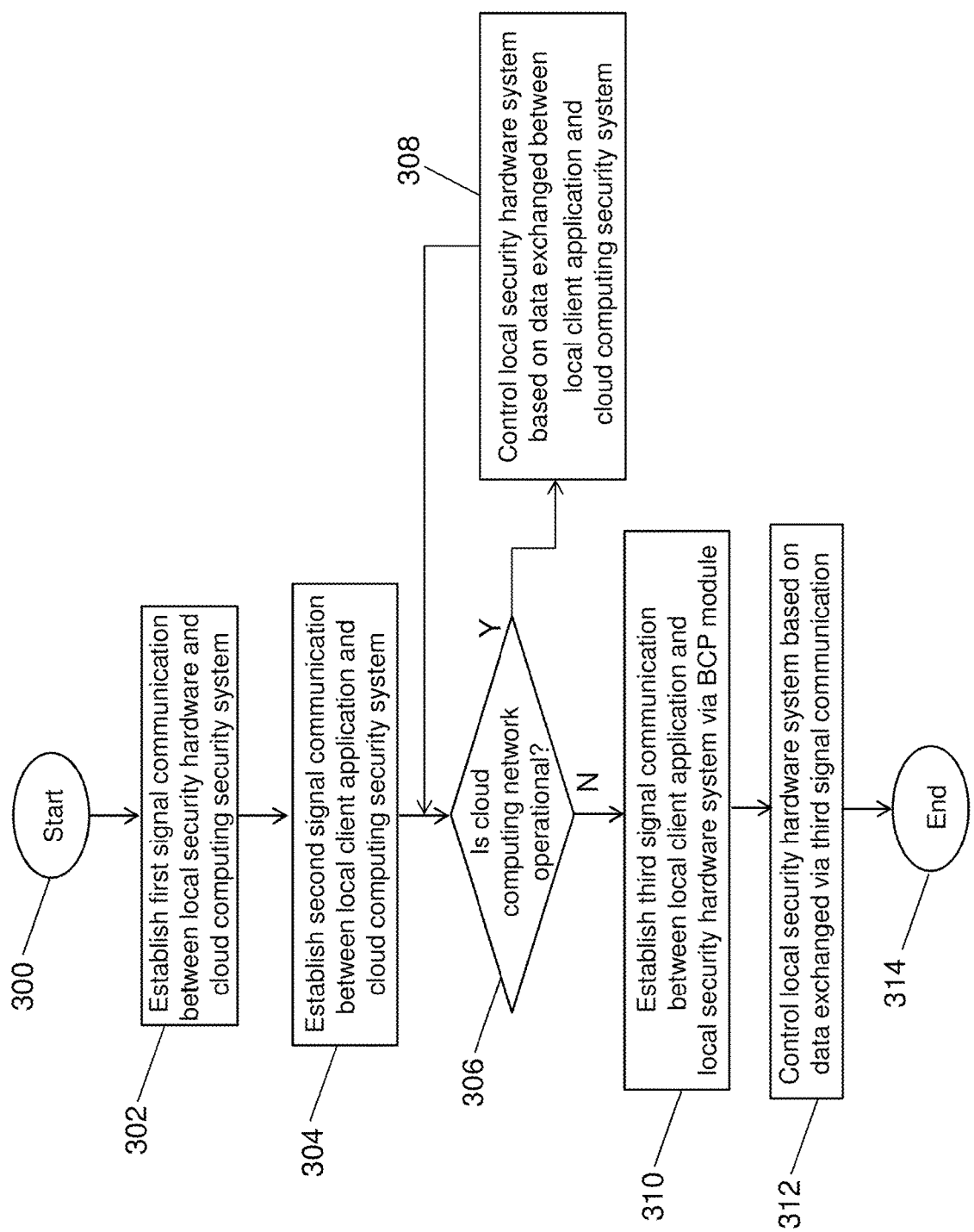
FIG. 3 is a flow diagram illustrating a method of controlling a security system according to at least one non-limiting embodiment.

Referring to FIG. 3, a method of controlling a security system network is illustrated according to at least one non-limiting embodiment of the invention. The method begins at operation 300, and at operation 302, a first signal communication is established between a local security hardware system and a cloud computing security system. The first signal communication is established via an intermediate control module such as, for example, an electronic business continuity provider (BCP) module that is in electrical communication with both the local security hardware system installed at a local premises or facility and a cloud computing security system operable in a cloud computing network. The local security hardware system may also be in signal communication with a local communication network (e.g., Wi-Fi, LAN, etc.) installed at the local premises or facility. In this manner, the local security hardware system may establish signal communication with the cloud computing network.

At operation 304, a second signal communication is established between at least one local client application and the cloud computing security system. In at least one embodiment, the local client application is installed on one or more electronic devices located at the local premises or facility monitored and controlled by the local security hardware system. At operation 306, the operational status of the cloud computing network is monitored. In at least one embodiment, the operational status of the cloud computing network includes determining the operational status of the cloud computing security system installed in the cloud computing network. When the cloud computing network is operational, e.g., the cloud computing network is capable of exchanging data with the local client application and/or the local security hardware without incident, the local security hardware is controlled via signals delivered via the cloud computing network at operation 308, and the method returns to operation 306 to continue monitoring the operational status of the cloud computing network.

When, however, the cloud computing network is determined to be not operational, e.g., the cloud computing network is disconnected or fails to properly exchange data with the local client application and/or the local security hardware, the BCP module establishes a third signal communication between the local client application and the local security hardware at operation 310. At operation 312, the local security hardware system is controlled and/or monitored based on data exchanged via the third signal communication established by the BCP, and the method ends at operation 314. In this manner, the local security hardware system can be controlled and/or monitored using one or more local client applications independently from the operational status of the cloud computing network, e.g., regardless that the cloud computing network may be off-line or unable to exchange data.

As used herein, the term "module" refers to an application specific integrated circuit (ASIC), an electronic circuit, an electronic computer processor (shared, dedicated, or group) and memory that executes one or more software or firmware programs, a combinational logic circuit, a microcontroller, and/or other suitable components that provide the described functionality. When implemented in software, a module can be embodied in memory as a non-transitory machine-readable storage medium readable by a processing circuit and storing instructions for execution by the processing circuit for performing a method.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of controlling a security system network, the method comprising:

establishing a first signal communication between a local security hardware system and a cloud computing security system via an electronic business continuity provider (BCP) module, the cloud computing security system operable in a cloud computing network;

establishing a second signal communication between at least one local client application and the cloud computing security system; and selectively establishing a third signal communication between the at least one local client application and the local security hardware system via the BCP module so as to exchange data between the local security hardware system and the at least one local client application independently from an operational status of the first signal communication, wherein the operational status includes at least one of operation of the cloud computing security system, operation of the cloud computing network, and a data connection between the BCP module and the cloud computing network, and wherein the BCP module establishes the third signal communication in response to a faulty operation of at least one of the cloud-based security system and the cloud computing network so as to exchange data between the local security hardware system and the at least one local client application independently from an operational status of the first signal communication.

2. The method of claim 1, wherein the at least one local application delivers at least one security command via the BCP to command the local security hardware to perform at least one security operation independently from the operational status of the first signal communication.

3. The method of claim 2, wherein the at least one security operation includes locking or unlocking a physical entryway.

4. The method of claim 1, wherein the BCP receives at least one hardware status signal from the security hardware, and physically alerts an electronic device supporting the at least one local application in response to receiving the at least one hardware status signal.

5. The method of claim 4, wherein the physical alert includes at least one of a physical vibration, graphical alert, and sound alert.

6. The method of claim 1, wherein the BCP buffers at least one event received from the local security hardware during the disconnection of the first signal communication; and subsequently delivers the at least one buffer event to the cloud security system in response to re-establishing the first signal communication.

7. A security system network comprising:
a cloud computing security system operable in a cloud computing network;
a local security hardware system in signal communication with the cloud computing security system;
a BCP module including a first input/output (I/O) terminal in first signal communication with the cloud computing network, and a second I/O terminal in second signal communication with the local security hardware, the BCP module selectively establishing a third signal communication between at least one local client application and the local security hardware system so as to exchange data between the local security hardware system and the at least one local client application independently from an operational status of the first signal communication, wherein the operational status includes at least one of operation of the cloud computing security system, operation of the cloud computing network, and a data connection between the BCP module and the cloud computing network, and wherein the at least one local application delivers at least one security command via the BCP to command the local security hardware to perform at least one security operation independently from the operational status of the first signal communication so as to exchange data between the local security hardware system and the at least one local client application independently from an operational status of the first signal communication.

8. The security system of claim 7, wherein the BCP module stores at least one communication address corresponding to an electronic device operating the at least one local client, detects disconnection of the first signal communication, automatically establishes the third signal communication with electronic device corresponding to the at least one stored communication address in response to the disconnection, and outputs an alert signal that physically alerts the electronic device of the detected disconnection.

9. The security system of claim 7, wherein the at least one security operation includes locking or unlocking a physical entryway.

10. The security system of claim 7, wherein the BCP receives at least one hardware status signal from the security hardware, and physically alerts an electronic device supporting the at least one local application in response to receiving the at least one hardware status signal, the physical alert including at least one of a physical vibration, graphical alert, and sound alert.

11. The security system of claim 7, wherein the BCP buffers at least one event received from the local security hardware during the disconnection of the first signal communication; and subsequently delivers the at least one buffer event to the cloud security system in response to re-establishing the first signal communication.

* * * * *